US011330828B2

(12) United States Patent
Inoue et al.

(10) Patent No.: US 11,330,828 B2
(45) Date of Patent: May 17, 2022

(54) POWDERY PLANT EXTRACT FOR BEVERAGES AND PROCESS FOR PRODUCING THE SAME

(71) Applicant: Hayashibara Co., Ltd., Okayama (JP)

(72) Inventors: Shinichiro Inoue, Okayama (JP); Hikaru Masahiro Watanabe, Okayama (JP)

(73) Assignee: HAYASHIBARA CO., LTD., Okayama (JP)

( * ) Notice: Subject to any disclaimer, the term of this patent is extended or adjusted under 35 U.S.C. 154(b) by 373 days.

(21) Appl. No.: 16/339,436

(22) PCT Filed: Oct. 4, 2017

(86) PCT No.: PCT/JP2017/036184
§ 371 (c)(1),
(2) Date: Apr. 4, 2019

(87) PCT Pub. No.: WO2018/066613
PCT Pub. Date: Apr. 12, 2018

(65) Prior Publication Data
US 2019/0230951 A1    Aug. 1, 2019

(30) Foreign Application Priority Data

Oct. 7, 2016  (JP) .............................. JP2016-199504

(51) Int. Cl.
*A23F 3/30* (2006.01)
*A23F 3/16* (2006.01)
*A23L 2/39* (2006.01)
*A23F 5/24* (2006.01)

(52) U.S. Cl.
CPC .................. *A23F 3/30* (2013.01); *A23F 3/16* (2013.01); *A23F 5/24* (2013.01); *A23L 2/39* (2013.01)

(58) Field of Classification Search
CPC ...... A23F 3/16; A23F 3/30; A23F 5/24; A23L 2/39
See application file for complete search history.

(56) References Cited

U.S. PATENT DOCUMENTS

| 6,248,566 B1* | 6/2001 | Imanaka ............. C08B 37/0009 435/72 |
| 2008/0261897 A1 | 10/2008 | Dorr et al. | |
| 2010/0120710 A1 | 5/2010 | Watanabe et al. | |
| 2013/0323799 A1* | 12/2013 | Takaha ................... C12P 19/18 435/101 |
| 2015/0267234 A1 | 9/2015 | Watanabe et al. | |
| 2017/0218093 A1* | 8/2017 | Cheng ................. C12N 9/1051 |

FOREIGN PATENT DOCUMENTS

| EP | 2977052 A1 | 2/2014 |
| JP | 1985210949 A | 10/1985 |
| JP | 2000253820 A | 9/2000 |
| JP | 2001000108 A | 1/2001 |
| JP | 2008-118933 A | 5/2008 |
| JP | 2009017867 A | 1/2009 |
| JP | 2009028019 A | 2/2009 |
| JP | 2012217361 A | 11/2012 |
| WO | 2007059953 A1 | 5/2007 |
| WO | 2008136331 A1 | 11/2008 |

OTHER PUBLICATIONS

English Translation for JP2000253820 published Sep. 2000.*
English Translation for JP2009028019 published Feb. 2009.*
English Translation for JP2008118933 published May 2008.*

* cited by examiner

*Primary Examiner* — Anthony J Weier
(74) *Attorney, Agent, or Firm* — Browdy and Neimark, PLLC

(57) ABSTRACT

The present invention has objects to provide a powdery plant extract for beverages, having satisfactory flavor-retaining effect and solubility. The present invention solves the above objects by providing a powdery plant extract for beverages, comprising a plant extract for beverages and a branched α-glucan mixture having the following characteristics (A) to (C):

(A) Being constructed by glucose molecules;
(B) Having a branched structure with a glucose polymerization degree of one or more, bound via a linkage other than α-1,4 linkage to a non-reducing end glucose residue at an end position of a linear glucan with a glucose polymerization degree of 3 or higher, having a structure of binding glucose molecules via α-1,4 linkages; and
(C) Isomaltose in an amount of 5% by mass or higher, on a dry solid basis, of the hydrolysate is formed when digested by isomaltodextranase;

where the mass ratio of the plant extract for beverages and the branched α-glucan mixture is in a range of 1:0.1 to 1:20, on a dry solid basis.

13 Claims, No Drawings

POWDERY PLANT EXTRACT FOR BEVERAGES AND PROCESS FOR PRODUCING THE SAME

TECHNICAL FIELD

The present invention relates to a powdery plant extract for beverages, and more particularly, to a powdery plant extract for beverages exhibiting a satisfactory solubility and an aroma and flavor equivalent to those of conventional plant extract beverages (green tea, black tea, coffee, etc.) when dissolved, and a process for producing the same.

BACKGROUND ART

The powdery plant extract for beverages obtained by pulverizing the extract extracted from plants (plant extract for beverages) represented by powdered green tea or the like, is relatively easy to preserve because it is in a powdery form, and is useful because it can be easily prepared into a plant extract beverage by simply pouring hot water or the like into a container such as "yunomi" (Japanese teacup).

However, such a powdery plant extract for beverages has a problem that the flavor derived from the plant extract for beverages is deteriorated or volatilized during its manufacturing and storing. Various methods using various base materials for powdering have been proposed to retain the flavor derived from the plant extract, but, in terms of flavor retention, a fully satisfactory method has not been proposed yet. In addition, a problem of decreasing the solubility of the plant extract in water or hot water has been occurred by using a base material for powdering.

For example, Patent Literature 1 discloses a method for producing an instant tea having an excellent flavor and solubility, by spray-drying an aqueous solution containing a tea extract and dextrin with dextrose equivalent (DE) of 10 to 25 in the presence of carbon dioxide gas. However, since dextrin is added, there has been a problem in the instant tea that inherent flavor of tea is impaired due to the starchy odor and the viscosity derived from dextrin.

Patent Literature 2 discloses an instant tea retaining the flavor of tea leaves and having excellent storage stability, prepared by incorporating maltooligosaccharide with a specific polymerization degree into a tea extract. However, since relatively large amounts of maltooligosaccharides such as maltotetraose, maltopentaose, maltohexaose, and the like are used, there has been a problem in the instant tea that the sweetness derived from these maltoorigosaccharides sometimes impairs the inherent flavor of tea.

Patent Literature 3 discloses a method for producing an instant tea having excellent storage stability, which shows no deterioration of the flavor components even when stored for a long period of time, and the instant tea has almost the same flavor as tea obtained by a normal tea drinking method, by using cyclodextrin. However, in this method, since cyclodextrin is incorporated, there is a fear that the bitterness specific to the tea extract is masked, and as a result, the inherent flavor of tea is impaired.

Patent Literature 4 discloses a method for producing an instant tea, having a good flavor and excellent palatability when it was dissolved, by using an indigestible dextrin as a base material for powdering, dissolving carbon dioxide gas into a solution containing tea extract and the indigestible dextrin, and spray-drying the solution. However, this method is disadvantageous in that simply mixing the indigestible dextrin to tea extract to form instant tea, has poor solubility in water or hot water, and the step of adding the indigestible dextrin and further dissolving carbon dioxide gas into the dissolved tea extract to spray-dry it, is indispensable.

As far as the applicant knows, a powdery plant extract for beverages, having a sufficiently satisfactory solubility, which can be produced by a simple process and retains the inherent flavor of the plant extract for beverages, has not been provided yet. Under these circumstances, in the art, there has been desired a powdery plant extract for beverages having excellent solubility without impairing the inherent flavor and aroma and a process for producing the same.

PRIOR ART LITERATURE

Patent Literature

[Patent Literature 1] Japanese Patent Kokai No. 1985-210949
[Patent Literature 2] Japanese Patent Kokai No. 2001-000108
[Patent Literature 3] Japanese Patent Kokai No. 2000-253820
[Patent Literature 4] Japanese Patent Kokai No. 2009-017867

SUMMARY OF THE INVENTION

Object of the Invention

The present invention has been made in view of the above circumstances of the prior art, and the object of the present invention is to provide a powdery plant extract for beverages, which retains the inherent flavor and aroma of the plant extract for beverages and has an excellent solubility, and a process for producing the same.

Means of Attain the Object

To solve the above objects, the present inventors continued studying by trial and error. In the course of the study, the present inventors unexpectedly found that a powdery plant extract for beverages, obtained by the steps of incorporating a branched α-glucan mixture disclosed in International Patent Publication No. WO2008/136331 into the plant extract for beverages to give a prescribed mass ratio against the plant extract for beverages and pulverizing the resultant, exhibits inherent flavor and aroma of the plant extract for beverages and a relatively high solubility in water in comparison with conventional plant extracts for beverages. The present inventors established the powdery plant extract for beverages, a process for producing the same and accomplished the present invention.

The present invention solves the above objects by providing a powdery plant extract for beverages, which contains a plant extract for beverages and a branched α-glucan mixture characterized by the following characteristics (A) to (C), where the ratio of the plant extract for beverages to the branched α-glucan mixture included in the powdery plant extract for beverages is in the range of 1:0.1 to 1:20.

(A) Being constructed by glucose molecules;
(B) Having a branched structure with a glucose polymerization degree of one or more, bound via a linkage except for α-1,4 linkage to a glucose residue at the non-reducing end of a linear glucan with a glucose polymerization degree of 3 or higher, having a structure of binding glucose molecules via α-1,4 linkages; and (C) Isomaltose in an amount of 5% by mass or higher, on a dry solid basis of the hydrolysate, is formed when digested by isomaltodextranase.

Furthermore, the present invention solves the above objects by providing a process for producing a powdery plant extract for beverages, comprising the steps of obtaining a mixture solution by admixing a branched α-glucan mixture, having the above characteristics (A) to (C), and a plant extract for beverages to give the mass ratio of the plant extract for beverages to the branched α-glucan mixture of 1:0.1 to 1:20, on a dry solid basis, in the presence of an aqueous solvent and pulverizing the resulting solution.

Effect of the Invention

The powdery plant extract for beverages of the present invention exhibits superior solubility without impairing the inherent flavor and aroma of the plant extract for beverages in comparison with the conventional plant extracts for beverages when dissolved in a liquid such as water. According to the process for producing the powdery plant extract for beverages of the present invention, since the powdery plant extract for beverages can be prepared by a simple process of only admixing a branched α-glucan mixture and pulverizing the resultant, the powdery plant extract for beverages can be stably produced on an industrial scale, in large quantities, and in a relatively low cost.

MODE FOR CARRYING OUT THE INVENTION

The present invention relates to a powdery plant extract for beverages and a process for producing the same, wherein said powdery plant extract for beverages contains a plant extract for beverages and a branched α-glucan mixture having the following characteristics (A) to (C), where the ratio of the plant extract for beverages to the branched α-glucan mixture is in the range of 1:0.1 to 1:20:
(A) Being constructed by glucose molecules;
(B) Having a branched structure with a glucose polymerization degree of one or more, bound via a linkage except for α-1,4 linkage to a glucose residue at the non-reducing end of a linear glucan with a glucose polymerization degree of 3 or higher, having a structure of binding glucose molecules via α-1,4 linkages; and
(C) Isomaltose in an amount of 5% by mass or higher, on a dry solid basis of the hydrolysate, is formed when digested by isomaltodextranase.

The term "a powdery plant extract for beverages" as referred to as in the present specification means a product obtained by drying a plant extract for beverages extracted from a plant using an aqueous solvent and pulverizing it. Examples of the plants include *Camellia sinensis* such as *Camellia sinensis* and assam; Herbs such as chamomile, hibiscus, lavender, mint, rose hip, peppermint, lemon grass, "dokudami" (*Houttuynia cordata*), gymnema, banaba (*Lagerstroemia speciose*), Ginkgo biloba, *Corchorus olitorius*, alfalfa, *Artemisia indica, Ilex paraguariensis, Gabaron, Eucommia ulmoides, Aspalathus linearis*, Aloe, cherry leaf, and *Perilla frutescens* var. *crispa*; Cereals such as wheat, adlay, rice plant, soy, and buckwheat; Root crops such as ginseng and burdock; coffee tree, and the like.

The term "a plant extract for beverages" as referred to as in the present specification means a product made by extracting, if necessary, processing such as drying, roasting, and fermenting one or more parts of the above plant, selected from leaf, stem, flower, calyx, root and seed. Examples of such plant extract for beverages include green tea, oolong tea, black tea, roasted green tea, coarse tea, herbal tea, *eucommia* tea, rooibos tea, "dokudami" tea, barley tea, brown rice tea, buckwheat tea, burdock tea, green coffee beans tea, and the like.

The term "a branched α-glucan mixture" as referred to as in the present specification means, for example, a branched α-glucan mixture disclosed in International Patent Publication No. WO2008/136331 by the same applicant as the present application (called simply "a branched α-glucan mixture", hereinafter). The branched α-glucan mixture can be obtained by using starch as a raw material and allowing various enzymes to act on it, and the branched α-glucan mixture is usually in the form of a mixture mainly composed by plural kinds of branched α-glucans having various branched structures and glucose polymerization degrees. As a process for producing the branched α-glucan mixture, a process comprising a step of allowing α-glucosyltransferase, disclosed in International Patent Publication No. WO2008/136331, to act on starch or allowing the α-glucosyltransferase in combination with one or more amylases selected from the group consisting of maltotetraose-forming amylase (EC 3.2.1.60), starch-debranching enzymes such as pullulanase (EC 3.2.1.41) and isoamylase (EC 3.2.1.68), cyclomaltodextrin glucanotransferase (EC 2.4.1.19), branching enzyme (EC 2.4.1.18), and an enzyme having an activity of transferring α-1,4 glucan having a glucose polymerization degree of 2 or higher to internal glucose residues of starch by α-1,6 transglucosylation, disclosed in Japanese Patent Kokai No. 2014-54221, can be used. In the current art, it is impossible or extremely difficult to isolate and quantify respective branched α-glucan molecule, and to determine the structure, i.e., the binding mode and binding order of glucose residues which constitutes the branched glucan. However, the branched α-glucan mixture can be characterized as whole by various physical, chemical, or enzymatic methods commonly used in the art.

Structures of the branched α-glucan mixture used in the present invention can be characterized as whole mixture by the characteristics (A) to (C). The branched α-glucan mixture is a mixture of glucans constructed by glucose molecules (characteristic (A)), and has branched structures with a glucose polymerization degree of one or more which binds to a glucose residue at the non-reducing end, a position at one end of a linear glucan with a glucose polymerization degree of 3 or higher that are linked together via the α-1,4 linkage; via a linkage except for the α-1,4 linkage (characteristic (B)). The term "a glucose residue at the non-reducing end" means a glucose residue present at the end exhibiting no reducing power of a glucan chain linked together via the α-1,4 linkage. The term "a linkage except for α-1,4 linkage" means in literally a linkage other than the α-1,4 linkage such as α-1,2, α-1,3, and α-1,6 linkages.

In addition, the branched α-glucan mixture used in the present invention has the characteristic that isomaltose in an amount of 5% by mass or higher, on a dry solid basis of the hydrolysate, is formed when digested by isomaltodextranase (characteristic (C)).

Thus, the branched α-glucan mixture used in the present invention is the mixture of glucans, characterized by the above characteristics (A) to (C). Among the characteristics, supplementary explanation about characteristic (C) is as follows.

With respect to the above characteristic (C) characterizing the branched α-glucan mixture used in the present invention, isomaltodextranase digestion means that an isomaltodextranase is allowed to act on the branched α-glucan mixture to hydrolyze it. Isomaltodextranase is an enzyme which is given the enzyme number (EC) 3.2.1.94 and has a characteristic of hydrolyzing any of α-1,2, α-1,3, α-1,4, and α-1,6 linkages adjacent to the reducing end of the isomaltose structure in α-glucan. An isomaltodextranase derived from *Arthrobacter globiformis* (for example, Sawai et al., *Agricultural and Biological Chemistry*, Vol. 52, No. 2, pp. 495-501 (1988)) is preferably used for isomaltodextaranase digestion.

The content of isomaltose in the hydrolysate, on a dry solid basis of hydrolysate, obtained by isomaltodextranase digestion, indicates the ratio of isomaltose structure that can be hydrolyzed by isomaltodextranase in the structure of the branched α-glucan constituting of the branched α-glucan mixture. The structure of the branched α-glucan mixture can be characterized enzymatically as whole by the characteristic (C).

In the branched α-glucan mixture used in the present invention, that liberates, usually, 5% by mass or higher, preferably, 10% by mass or higher, more preferably, 15% by mass or higher, further preferably, 20% by mass or higher but 70% by mass or lower, and most preferably, 20% by mass or higher but 60% by mass or lower, of isomaltose, on a dry solid basis of hydrolysate, by isomaltodextranase digestion, can be preferably used for carrying out the present invention because it exhibits a relatively strong effect of retaining the inherent flavor of plant extract when powdering the plant extract for beverages.

As described later, it is considered that the isomaltose structure in each α-glucan molecule constituting the branched α-glucan mixture is deeply involved in the effect of retaining the flavor when the powdery plant extract for beverages of the present invention is dissolved. The branched α-glucan mixture which liberates isomaltose in an amount of less than 5% by mass by isomaltodextranase digestion, has a structure close to that of maltodextrin having a few branched structures. The branched α-glucan mixture having such a structure is not preferable because it has few structural characteristics considered to be involved in retaining the flavor when the powdery plant extract for beverages is dissolved. There is a preferable range of the amount of isomaltose formed when digested by isomaltodextranase.

As a preferable embodiment of the branched α-glucan mixture used in the present invention, the branched α-glucan mixture having the characteristic (D) i.e., the content of water-soluble dietary fiber, determined by high-performance liquid chromatography (Enzyme-HPLC method) is 40% by mass or higher, can be used.

With respect to the above characteristic (D) characterizing the branched α-glucan mixture used in the present invention, "High performance liquid chromatography method (Enzyme-HPLC method)" (hereinafter, called simply as "Enzyme-HPLC method") for determining the content of water soluble dietary fibers is a method disclosed in the section "Dietary Fibers" at page 8 in the section "Analytical Method, etc., for Nutritional Components (Appendix 1-3 of Nutrition Labeling Standard) in Nutrition Labeling Standard (Notification No. 146 of Ministry of Health, Labour and Welfare, May, 1996)". The outline of the Enzyme-HPLC method is as follows: A sample is hydrolyzed by a series of enzyme-treatments using a thermostable α-amylase, protease, and glucoamylase. Then, proteins, organic acids, and inorganic salts are removed from the resulting enzyme-treated mixture using ion-exchange resins to make into a sample solution for gel-filtration chromatography. Successively, the sample solution is subjected to gel-filtration chromatography for measuring peak areas of remaining undigested glucan and glucose in the gel-filtration chromatogram. Then, the content of water soluble dietary fiber in the sample is calculated based on the peak areas and the amount of glucose in the sample solution, separately determined by conventional glucose oxidase-peroxidase method. Throughout the specification, the term "content of water soluble dietary fiber" means a content of water-soluble dietary fiber determined by the above Enzyme-HPLC method.

The content of water-soluble dietary fiber indicates the content of α-glucan not hydrolyzed by α-amylase and glucoamylase, and the characteristic (D) is one of the indexes that characterize the structure of the branched α-glucan mixture as whole by enzymatic procedure.

The branched α-glucan mixture having the above characteristics (A) to (C) and having the content of water-soluble dietary fiber of 40% by mass or higher but less than 100% by mass, preferably, 50% by mass or higher but less than 95% by mass, more preferably 60% by mass or higher but less than 90% by mass, and most preferably, 70% by mass or higher but less than 85% by mass, can be preferably used for carrying out the present invention because it exhibits a relatively strong effect of retaining flavor when the powdery plant extract for beverages is dissolved in water or the like.

Further, a preferable embodiment of the branched α-glucan mixture includes those having the following characteristics (E) and (F), and the characteristics can be determined by methylation analysis.
(E) Ratio of glucose residues bound via α-1,4 linkage to glucose residues bound via α-1,6 linkage is in the range of 1:0.6 to 1:4;
(F) Total content of glucose residues bound via α-1,4 linkage and glucose residues bound via α-1,6 linkage is 55% or higher in the whole glucose residues;

As is well known, methylation analysis is a method generally and widely used for determining the binding mode of a monosaccharide constituting a polysaccharide or oligosaccharide (Ciucanu et al., Carbohydrate Research, Vol. 131, No. 2, pp. 209-217 (1984)). When methylation analysis is applied to analyze the binding mode of glucose in glucan, all free hydroxyl group in the glucose residues constituting the glucan are firstly methylated and then the resulting fully methylated glucan is hydrolyzed. Subsequently, the methylated glucose obtained by the hydrolysis is reduced to make into methylated glucitol whose anomeric form has been eliminated, and the free hydroxyl groups in the methylated glucitol are acetylated to obtain partially methylated glucitol acetate (in some cases, the "partially methylated glucitol acetate" is simply collectively abbreviated as "partially methylated product"). By analyzing the resulting partially methylated products by gas chromatography, the contents of each partial methylated product derived from glucose residue having different binding mode in the glucan is respectively determined as a percentage (%) against the total peak area of all partial methylated products in the gas chromatogram. From the peak area (%), the ratio of glucose residue varying in the binding mode in the glucan, i.e., the ratio of respective glucosidic linkage can be determined. "Ratio" for partially methylated product means the ratio of peak area in gas chromatogram obtained in the methylation analysis and "%" for partially methylated product means "area (%)" in gas chromatogram obtained in the methylation analysis.

The "glucose residue bound via α-1,4 linkage" in the above characteristics (E) and (F) means a glucose residue bound to other glucose residue via hydroxyl groups of its C1- and C4-positions, and the glucose residue is detected as 2,3,6-trimethyl-1,4,5-triacetyl-glucitol in methylation analysis. In addition, the "a glucose residue bound via α-1,6 linkage" in the above characteristics (E) and (F) means a glucose residue bound to other glucose residue via hydroxyl groups of its C1- and C6-positions, and the glucose residue is detected as 2,3,4-trimethyl-1,5,6-triacetylglucitol in methylation analysis.

The ratio of glucose residues bound via α-1,4 linkage and glucose residues bound via α-1,6 linkage, and the total content of glucose residues bound via α-1,4 linkage and glucose residues bound via α-1,6 linkage in the whole glucose residues, respectively obtained by methylation analysis, can be used as indexes for characterizing the structure of branched α-glucan mixture as whole by chemical procedure.

The above characteristic (E), i.e., "the ratio of glucose residues bound via α-1,4 linkage to glucose residues bound via α-1,6 linkage is in the range of 1:0.6 to 1:4" means that the ratio of 2,3,6-trimethyl-1,4,5-triacetyl-glucitol and 2,3,4-trimethyl-1,5,6-triacetyl-glucitol, detected when the branched α-glucan mixture is subjected to methylation analysis, is in the range of 1:0.6 to 1:4. While, the above characteristic (F), i.e., "the total content of glucose residues bound via α-1,4 linkage and glucose residues bound via α-1,6 linkage is 55% or higher in the whole glucose residues" means that, in methylation analysis, the total content of 2,3,6-trimethyl-1,4,5-triacetyl-glucitol and 2,3,4-trimethyl-1,5,6-triacetyl-glucitol is 55% or higher in the partially methylated glucitol acetate, when the branched α-glucan mixture is subjected to methylation analysis. Generally, starch has no glucose residue bound via hydroxyl groups at only C1 and C6 positions, and glucose residue bound via α-1,4 linkage occupies the majority of whole glucose residue. Therefore, the above characteristics (E) and (F) mean that the branched α-glucan mixture has a completely different structure from starch.

As defined by the above characteristics (E) and (F), the branched α-glucan mixture has, in preferred embodiments, "glucose residues bound via α-1,6 linkage" not usually present in starch. In the case of desiring a strong flavor retaining effect, a branched α-glucan mixture, having α-1,3 linkage and α-1,3,6 linkage in addition to α-1,4 and α-1,6 linkages, is preferable because those having more complex branched structures can be expected to have a greater effect. Specifically, for example, the content of glucose residue bound via α-1,3 linkage in the whole glucose residue is preferable to be 0.5% or higher but less than 10%, and the content of glucose residue bound via α-1,3,6 linkage in the whole glucose residue is preferable to be 0.5% or higher. While, "glucose residue bound via α-1,3,6 linkage" means "glucose residue bound to other glucose via three hydroxyl groups at C1, C3, and C6 positions".

The fact that "the content of glucose residue bound via α-1,3 linkage in the whole glucose residue is 0.5% or higher but less than 10%" can be confirmed by the steps of subjecting the branched α-glucan mixture to methylation analysis, and determining the content of 2,4,6-trimethyl-1,3,5-triacetylglucitol in the partially methylated glucitol acetate to be 0.5% or higher but less than 10%. While, the fact that "the content of glucose residue bound via α-1,3,6 linkage in the whole glucose residue is 0.5% or higher" can be confirmed by the steps of subjecting the branched α-glucan mixture to methylation analysis, and determining the content of 2,4,6-trimethyl-1,3,5-triacetylglucitol in the partially methylated glucitol acetate to be 0.5% or higher but less than 10%.

The branched α-glucan mixture can also be characterized by the weight average molecular weight (Mw) and the value (Mw/Mn) obtained by dividing the weight average molecular weight (Mw) by the number average molecular weight (Mn). The weight average molecular weight (Mw) and the number average molecular weight (Mn) can be determined by using, for example, size exclusion chromatography or the like. In addition, the branched α-glucan mixture can also be characterized by the average glucose polymerization degree since the average glucose polymerization degree of the branched α-glucan constituting the branched α-glucan mixture can be calculated based on the weight average molecular weight (Mw). The average glucose polymerization degree can be obtained by subtracting 18 from the weight average molecular weight (Mw) and dividing the value by 162, which is the weight of glucose residues. The branched α-glucan mixture preferably used for the powdery plant extract for beverages is that having the average glucose polymerization degree of, usually, 8 to 500, preferably, 15 to 400, more preferably, 20 to 300. The branched α-glucan mixture exhibits the same properties with ordinary glucan in that the viscosity increases with the increase of the average glucose polymerization degree, and the viscosity decreases with the decrease of the average glucose polymerization degree. Therefore, according to the embodiment of the powdery plant extract for beverages of the present invention, the branched α-glucan mixture having the average glucose polymerization degree suitable for the viscosity required for a beverage can be appropriately selected and used.

The Mw/Mn obtained by dividing the weight average molecular weight (Mw) by the number average molecular weight (Mn) means that the closer to 1, the smaller the variation in the glucose polymerization degree of the branched α-glucan molecules constituting the branched α-glucan mixture. Although the branched α-glucan mixture can be used without any problem as long as Mw/Mn being, usually, 20 or lower for the plant extract for beverages, the value is, preferably, 10 or lower, more preferably, 5 or lower.

Although the branched α-glucan mixture used in the present invention is as described above, in the practice of the present invention, the various branched α-glucan mixtures disclosed in the above-mentioned International Patent Publication No. WO2008/136331 can be used. Among them, the branched α-glucan mixture obtained by allowing α-glucosyltransferase derived from *Bacillus circulans* PP 710 (FERM BP-10771) and/or *Arthrobacter globiformis* PP 349 (FERM BP-10770) to act on material starch or allowing the α-glucosyltransferase in combination with starch-branching enzyme such as pullulanase (EC 3.2.1.41), isoamylase (EC 3.2.1.68), and/or cyclomaltodextrin glucanotransferase (EC 2.4.1.19 (CGTase)), can be more preferably used. Furthermore, a branched α-glucan mixture commercialized by the present applicant, Hayashibara Co., Ltd., as isomaltodextrin (registered trademark "FIBRYXA") can be particularly and suitably used.

Regarding to the amount of the branched α-glucan mixture incorporated into the powdery plant extract for beverages of the present invention, the mass ratio of a plant extract for beverages to the branched α-glucan mixture is, usually, 1:0.1 to 1:20, preferably, 1:0.33 to 1:5, on a dry solid basis. The powdery plant extract for beverages containing the branched α-glucan mixture in the above range has excellent solubility and retains a flavor and aroma equivalent to plant extract beverages (green tea, black tea, coffee, etc.) when dissolved in hot water. In the case of the mass ratio being less than 0.1, it is not preferable because the above-mentioned effects of the branched α-glucan mixture cannot be sufficiently exhibited. On the contrary, in the case of the mass ratio being over 20, properties such as flavor and solubility tend to be deteriorated by a large amount of branched α-glucan mixture. The branched α-glucan mixture incorporated into the powdery plant extract for beverages of the present invention is usually added to the plant extract in a powdery form. If necessary, it can be incorporated in a liquid form dissolved in water or the like, or in a syrupy form.

The powdery plant extract for beverages of the present invention is characterized in that the inherent flavor and aroma of the plant extract beverages are well retained by incorporating with a branched α-glucan mixture, when the powdery plant extract for beverages is dissolved in a liquid such as water. Although the mechanism of retaining the flavor and aroma of the powdery plant extract for beverages by incorporating with the branched α-glucan mixture is not clear, it is presumed that the branched α-glucan mixture having the above characteristics (A) to (C) exhibits some interaction with terpenes, aldehydes, pyrazines, pyrroles, furans, which are major flavor and aroma components of the plant extract beverages (in particular, tea).

Thus, the powdery plant extract for beverages of the present invention contains a prescribed amount of the branched α-glucan mixture, whereby the flavor is effectively retained and, in addition, the satisfactory solubility is obtained. In the powdery plant extract for beverages of the present invention, other components except for the branched α-glucan mixture can be arbitrary incorporated in appropriate amounts, if necessary. Examples of the other components include preservatives, colorants, excipients, binders, flavoring agents, antioxidants, pH adjusters, sweeteners, flavors, acidulants, seasonings, and the like, and one or more suitable combinations of these can be used in suitable amounts. The amount of the other ingredients can be appropriately determined according to the kind thereof and the kind of the powdery plant extract for beverages. The amount of the other ingredients can be respectively set to, usually, 0.0001% by mass or higher, preferably, 0.001 to 30% by mass, more preferably, 0.01 to 20% by mass, most preferably, 0.01 to 10% by mass, on a dry solid basis, of the powdery plant extract for beverages. Further, the other ingredients can be appropriately incorporated in an adequate amount in one or more steps in a process for producing the powdery plant extract for beverages of the present invention.

The preservatives include, for example, edible organic acids such as acetic acid, citric acid, malic acid, fumaric acid, lactic acid, and the like; alcohols such as ethyl alcohol, propylene glycol, glycerin and the like; amino acids such as glycine, alanine and the like; salts such as sodium chloride, acetate, citrate, sodium carbonate, potassium carbonate, calcium oxide, calcium hydroxide, calcium carbonate, disodium phosphate, tripotassium phosphate and the like.

The colorants include, for example, natural colorants such as "aka koji", crab shell powder, astaxanthin, vegetable pigment, "beni koji" (monascus) pigment, concentrated phaffia pigment oil, *gardenia* yellow, "matcha" pigment, cochineal pigment, *gardenia* yellow pigment, *gardenia* blue pigment, flavonoid pigment, caramel pigment, β-carotene, carotenoid-type pigment, charcoal; and synthetic colorants such as Red No. 2 (Amaranth), Red No. 3 (Erythrosine), Red No. 104 (Phloxine), Red No. 105 (Rose Bengale), Red No. 106 (Acid Red), Yellow No. 4 (Tartrazine), Yellow No. 5 (Sunset Yellow), Blue No. 1 (Brilliant Blue), titanium dioxide.

The sweeteners include, for example, sucrose, glucose, fructose, isomerized liquid sugar, glycyrrhizin, *stevia*, aspartame, fructo-oligosaccharides and the like.

The powdery plant extract for beverages of the present invention can be administered by dissolving in water, hot water, milk, and the like, and can be incorporated into biscuits such as cookies, crackers, biscuits and the like; jelly, mousse, bavaroa, pudding, ice cream, "warabi mochi", dumpling steamed bun, pound cake, chiffon cake, souffle and the like. It can also be incorporated into supplements such as tablets, granules, and the like. The inherent flavor of the plant extract can be given to various foods and beverages, tablets, granules and the like by incorporating the powdery plant extract for beverages of the present invention into them. Although the amount of the powdery plant extract for beverages in those foods varies depending on the kind of foods, usually, 1 to 100% by mass, particularly, 5 to 80% by mass, is suitably used.

<Process for Producing the Powdery Plant Extract for Beverages of the Invention>

The present invention relates to a process for producing the powdery plant extract for beverages comprising the steps of admixing a branched α-glucan mixture having the above characteristics (A) to (C) with a plant extract for beverages in the presence of an aqueous solvent to give the mass ratio of the plant extract for beverages to the branched α-glucan mixture of 1:0.1 to 1:20, on a dry solid basis, to make into a mixture solution, and pulverizing the resulting mixture solution.

The outline of the process for producing the powdery plant extract for beverages can be concretely described as follows; The process comprises the steps of adding aqueous solvent to a material plant and extracting to obtain the extract (extracting step); admixing the branched α-glucan mixture with the resulting extract (plant extract) and dissolving; concentrating the extract (concentrating step), and successively drying the concentrate by removing the aqueous solvent (drying step), and optionally pulverizing and sifting the obtained powdery composition to make into a powdery plant extract for beverages. The method of incorporating the branched α-glucan mixture into the extract (plant extract) can be advantageously carried out by one or more methods of dissolving it into the aqueous solvent beforehand, admixing it to the extract, and admixing it to the concentrate of the extract.

The extracting step comprises the steps of adding an aqueous solvent to a material plant and extracting by dipping, stirring or heating to obtain the extract. Water such as tap water, deionized water, distilled water, deoxygenated water, and the like; ethanol and their mixture can be used as the aqueous solvent. Additives such as antioxidants, emulsifiers, and pH adjusters can be incorporated solely or in combination into the aqueous solvent. Also, without using any aqueous solvent, a squeezing liquid obtained by squeezing material plant can be used as an extract. Although the extraction temperature is not particularly restricted, it is preferably controlled to be 15° C. or higher and 100° C. or lower. When the extraction temperature is lower than 15° C., the extraction efficiency is remarkably lowered, and at temperatures exceeding 100° C., unnecessary components are excessively extracted, and denaturation of the aroma component tends to occur.

The concentrating step is a step of selectively removing an aqueous solvent from a plant extract to increase the concentration of the extract. Although the concentrating step itself is not essential, the extract can be efficiently dried in the drying step by concentrating the extract solution in advance. Concentration can be carried out by well-known methods such as vacuum concentration, freeze concentration, reverse osmosis membrane concentration, and the like. Among them, reverse osmosis membrane concentration and freeze concentration are preferred because of less volatilization or denaturation of aroma components derived from a plant extract.

The drying step is a step of evaporating the aqueous solvent in the extract (or concentrated solution) containing the branched α-glucan mixture, drying and powdering the extract. The drying and powdering can be carried out by an appropriate method such as hot air drying, vacuum drying, spray drying, freeze drying under vacuum, drum drying, extrusion granulation, fluidized granulation, and the like. Among them, freezing vacuum drying and spray drying are preferable because the loss of the flavor component derived from the plant extract is lower during the drying.

The following experiments explain the present invention in more detail.

Experiment 1

Effect of a Base Material for Powdering on a Flavor of a Plant Extract Beverages (1) Outline Powdery plant extracts for beverages were prepared by incorporating a branched α-glucan mixture or an indigestible dextrin into a plant extract for beverages as a base material for powdering, and the effect of the base material on a flavor of the plant extract beverages when each powdery plant extract was dissolved in hot water was investigated.

(2) Methods (a) Preparation of Test Samples

To 50 g (Solid content 5 g) of "OOLONG TEA EXTRACT M AQUEOUS", a solution containing 10% by mass of solid oolong tea extract, commercialized by Maruzen Pharmaceuticals Co., Ltd., Hiroshima, Japan, 0.5, 1.65, 2.5, 5.0, 25.0, 50.0, 100.0, or 200.0 g of a powdery branched α-glucan mixture used in the following Example 1 (called "branched α-glucan mixture", hereinafter) was admixed and then appropriate amount of water was added if necessary to make into 8 kinds of oolong tea extract different in the amount of the branched α-glucan mixture. Successively, each oolong tea extract containing the branched α-glucan mixture was freeze-dried to make into Test sample 1 to 8, powdery plant extracts for beverages (oolong tea powders). As comparison products, oolong tea powders, Test sample 9 to 16, were prepared by the same method except for using "FIBERSOL 2", an indigestible dextrin commercialized by Matsutani Chemical Industries Co., Ltd., Hyogo, Japan, as a substitute of the branched α-glucan mixture. Test samples 1 to 8 and Test samples 9 to 16 contain the branched α-glucan mixture or the indigestible dextrin in amounts of 0.1, 0.33, 0.5, 1, 5, 10, 20, or 40 parts by mass to one part by mass of solid oolong tea extract.

(b) Sensory Test

Powdery oolong tea, Test samples 1 to 16, and a material oolong tea extract (Control) were respectively put in a cup to give the amount of 0.33 g-solid derived from oolong tea extract, dissolved in 100 ml of hot water at 70° C. Then, the flavors were sensory evaluated based on evaluation criteria shown in Table 1 by 5 panelists. An evaluation score with the highest number of panelists was taken as the evaluation score. In the case of the same number of panelists, the midpoint of the evaluation score was taken as the evaluation score. Compositions of Control and Test samples 1 to 16, and the results of those sensory evaluations were shown in Table 2.

TABLE 1

| Score | Strength of flavor | Qualities of bitterness and astringent taste | Taste derived from base material for powdering | Comprehensive evaluation |
|---|---|---|---|---|
| 5 | Very strong | Very good | Sweetness and unpleasant smell of base material are not detected. | Very good |
| 4 | Strong | Good | Sweetness and unpleasant smell of base material are slightly detected, but good. | Good |
| 3 | Slightly strong | Slightly good | Sweetness and unpleasant smell of base material are detected, but acceptable. | Slightly good |
| 2 | Slightly weak | Slightly bad | Sweetness and unpleasant smell of base material are detected, and not acceptable. | Slightly bad |
| 1 | Weak | Bad | Sweetness and unpleasant smell of base material are strongly detected, and hardly acceptable. | Bad |

TABLE 2

| | Amount against one part by mass of oolong tea extract, on a dry solid basis (parts by mass) | | Score of sensory evaluation | | | |
|---|---|---|---|---|---|---|
| | | | | Qualities of | | |
| Test sample | Branched α-glucan | Indigestible dextrin | Strength of flavor | bitterness and astringent taste | Taste of base material | Comprehensive evaluation |
| 1 | 0.1 | | 5 | 3 | 5 | 4 |
| 2 | 0.33 | | 5 | 4 | 5 | 5 |
| 3 | 0.5 | | 5 | 5 | 5 | 5 |
| 4 | 1 | | 5 | 5 | 5 | 5 |
| 5 | 5 | | 5 | 5 | 5 | 5 |
| 6 | 10 | | 4 | 4 | 4 | 4 |
| 7 | 20 | | 4 | 4 | 4 | 4 |
| 8 | 40 | | 2 | 2 | 2 | 2 |
| 9 | | 0.1 | 3 | 2 | 5 | 3 |

TABLE 2-continued

| | Amount against one part by mass of oolong tea extract, on a dry solid basis (parts by mass) | | Score of sensory evaluation | | | |
|---|---|---|---|---|---|---|
| | | | Qualities of | | | |
| Test sample | Branched α-glucan | Indigestible dextrin | Strength of flavor | bitterness and astringent taste | Taste of base material | Comprehensive evaluation |
| 10 | | 0.33 | 3 | 2 | 4 | 3 |
| 11 | | 0.5 | 3 | 2 | 3 | 2 |
| 12 | | 1 | 2 | 2 | 2 | 2 |
| 13 | | 5 | 2 | 2 | 2 | 2 |
| 14 | | 10 | 1 | 1 | 2 | 1 |
| 15 | | 20 | 1 | 1 | 1 | 1 |
| 16 | | 40 | 1 | 1 | 1 | 1 |
| Control | — | — | 5 | 5 | 5 | 5 |

As shown in Table 2, it was revealed that Test samples 1 to 7, oolong tea powders prepared by adding 0.1 to 20 parts by mass of the branched α-glucan mixture as a base material for powdering to one part by mass of solid oolong tea extract exhibited satisfactory aroma and flavor as in the case of Control oolong tea when those powder were dissolved in hot water to make into oolong tea. Particularly, Test samples 2 to 5, oolong tea powders prepared by adding 0.33 to 5 parts by mass of the branched α-glucan mixture exhibited more satisfactory aroma and flavor. While, it was also revealed that Test sample 8, oolong tea powders prepared by adding 40 parts by mass of the branched α-glucan mixture exhibited sweetness and unpleasant smell derived from the branched α-glucan mixture when the powder was dissolved in hot water to make into oolong tea and flavor and aroma inherent to oolong tea were damaged. On the contrary, it was revealed that Test samples 9 to 16, oolong tea powders prepared by adding the indigestible dextrin as a base material for powdering exhibited damaged aroma and flavor when the powders were dissolved in hot water to make into oolong tea, in comparison with the case of Control oolong tea. In addition, it was revealed that the effect became significant with increase of the amount of the indigestible dextrin.

Experiment 2

<Effects of Base Materials on Solubilities of the Powdery Plant Extracts for Beverages in Cold Water>

(1) Outline

A branched α-glucan mixture, indigestible dextrin, or dextrin was admixed with a plant extracts for beverages as a base material for powdering, and then effects of base materials on solubilities of the resulting powdery plant extracts for beverages were investigated. Regarding to the use of the plant extract for beverage in relatively cold water, the experiments were carried out under a relatively low temperature condition that the solubility of the plant extract for beverage is relatively low.

(2) Methods (a) Preparation of Test Samples

Oolong tea powder incorporated with a dextrin was prepared by the same method in Experiment 1, except for using "PINEDEX #1", a conventional starch hydrolysate (dextrin) with DE 7.5, commercialized by Matsutani Chemical Industries Co., Ltd., Hyogo, Japan, as a substitute of the branched α-glucan mixture or indigestible dextrin, and incorporating 5 parts by mass of the dextrin into one part by mass of an oolong tea extract.

(b) Solubility Test

To a 50 ml of cold water at 5° C., 0.5 g each of the oolong tea powder incorporated with the dextrin obtained in above (a), Test sample 5 obtained in Experiment 1 (an oolong tea powder containing 5 parts by mass of the branched α-glucan mixture to 1 part by mass of solid oolong tea extract), or Test Sample 13 (an oolong tea powder containing 5 parts by mass of the indigestible dextrin to 1 part by mass of solid oolong tea extract) were respectively added, and stirred at 200 rpm. The dissolutions were observed with eyes and the times required for complete dissolution were measured. The experiment was carried out twice, and the solubilities of the powders were evaluated in 4 levels based on the average times required for dissolving. The results were shown in Table 3. The 4 levels for solubility were as follows:

Level 4: Dissolved in a time of 5 minutes or more but less than 10 minutes;

Level 3: Dissolved in a time of 10 minutes or more but less than 15 minutes;

Level 2: Dissolved in a time of 15 minutes or more but less than 20 minutes;

Level 1: Dissolved in a time of 20 minutes or more;

TABLE 3

| Base material for powdering | Time required for dissolving | Levels for Solubility |
|---|---|---|
| Branched α-glucan mixture | 5 minutes or more but less than 10 minutes | 4 |
| Indigestible dextrin | 10 minutes or more but less than 15 minutes | 3 |
| Dextrin | 20 minutes or more | 1 |

As shown in Table 3, the oolong tea powder of the present invention, prepared by using the branched α-glucan mixture as a base material of powdering, showed the best solubility and completely dissolved in a time of 5 minutes or more but less than 10 minutes. While, the oolong tea powder, prepared by using the indigestible dextrin as a base material of powdering, required a time of 10 minutes or more but less than 15 minutes for dissolving and it was revealed that the powder has a relatively lower solubility than the powder of the present invention. The oolong tea powder, prepared by using the conventional dextrin as a base material of powdering, formed lumps when added into cold water, required a time of 20 minutes or more for complete dissolving, and showed significantly low solubility.

From the results in Experiments 1 and 2, it was revealed that the branched α-glucan mixture is advantageous to produce an oolong tea powder having a satisfactory solubility and aroma/flavor-retaining ability when dissolved in hot water, in comparison with a conventional dextrin used for conventional oolong tea powders and the indigestible dextrin presently commercialized as a water soluble dietary fiber as a base material for powdering. It was considered that such satisfactory solubility and flavor-retaining ability exhibited by the branched α-glucan mixture were also exhibited in the cases of tea prepared by extracting *Camellia sinensis*, and whole of plant extract beverages having aroma and flavor by using the branched α-glucan mixture as a base material for powdering.

Although the branched α-glucan mixture retains flavor derived from a plant extract for beverages more effectively than conventional base materials for powdering, the detail reason of the effect is unknown. However, it is considered that to exhibit the function, the structural characteristics of the above (A) to (C), particularly, the structural characteristic of liberating isomaltose in an amount of 5% by mass or higher, on a dry solid basis, of the hydrolysate, when digested by isomaltodextranase is required. It is suggested that the structural characteristic of the branched α-glucan mixture is affected to aroma and flavor components in a plant extract.

The following examples explain the present invention in more detail. However, the present invention is not restricted by them.

Example 1

<Powdered Green Tea>

To 10 kg of hot water at 80° C., 0.5 kg of green tea leaves were added and extracted for 15 minutes at 80° C. The residue was separated and 8 kg of green tea extract with Brix 2.5° was obtained. The resulting extract was clarified by centrifugation and subjected to concentration using a membrane. Then, to the resulting concentrate, 150 g of a powdery branched α-glucan mixture, having the following characteristics (A) to (J), obtained according to the method disclosed in Example 5 of the International Patent Publication No. WO2008/136331, was mixed and dissolved, and then the resulting solution was lyophilized to make into a powdered green tea. The mass ratio of the green tea extract to the branched α-glucan mixture was 1:0.75, on a dry solid basis. When the resulting powdered green tea was dissolved in hot water at 70° C., the powder was quickly dissolved and refreshing aroma and flavor inherent to green tea were detected.

<Characteristics of the Branched α-Glucan Mixture>

(A) Being constructed by glucose molecules;

(B) Having a branched structure with a glucose polymerization degree of one or more, bound via a linkage except for α-1,4 linkage to a glucose residue at the non-reducing end of a linear glucan with a glucose polymerization degree of 3 or higher, having a structure of binding glucose molecules via α-1,4 linkages;

(C) Isomaltose in an amount of 38.0% by mass, on a dry solid basis, of the hydrolysate, is formed when digested by isomaltodextranase;

(D) Having a content of water-soluble dietary fiber, determined by applying high performance liquid chromatography method (Enzyme-HPLC method), of 81.2% by mass;

(E) Ratio of glucose residues bound via α-1,4 linkage to glucose residues bound via α-1,6 linkage is 1:2.6;

(F) Total content of glucose residues bound via α-1,4 linkage and glucose residues bound via α-1,6 linkage is 70.3% in the whole glucose residues;

(G) Content of glucose residues bound via α-1,3 linkage is 2.8% in the whole glucose residue;

(H) Content of glucose residues bound via α-1,3,6 linkage is 7.2% in the whole glucose residue;

(I) Having a weight average molecular weight (Mw) of 4,600; and (J) Having Mw/Mn of 2.3.

Example 2

<Powdered Black Tea>

To 10 kg of hot water at 80° C., 0.75 kg of black tea leaves were added and extracted for 15 minutes at 80° C. The residue was separated and 8 kg of black tea extract with Brix 3.8° was obtained. The resulting extract was clarified by centrifugation and subjected to concentration using a membrane. Then, to the resulting concentrate, 300 g of a powdery branched α-glucan mixture, having the following characteristics (A) to (J), obtained according to the method disclosed in Example 3 of the International Patent Publication No. WO2008/136331, was mixed and dissolved, and the resulting solution was lyophilized to make into a powdered black tea. The mass ratio of the black tea extract to the branched α-glucan mixture was 1:1.5, on a dry solid basis. When the resulting powdered green tea was dissolved in hot water at 70° C., the powder was quickly dissolved and refreshing aroma and flavor inherent to black tea were detected.

<Characteristics of the Branched α-Glucan Mixture>

(A) Being constructed by glucose molecules;

(B) Having a branched structure with a glucose polymerization degree of one or more, bound via a linkage except for α-1,4 linkage to a glucose residue at the non-reducing end of a linear glucan with a glucose polymerization degree of 3 or higher, having a structure of binding glucose molecules via α-1,4 linkages;

(C) Isomaltose in an amount of 36.4% by mass, on a dry solid basis, of the hydrolysate, is formed when digested by isomaltodextranase;

(D) Having a content of water-soluble dietary fiber, determined by applying high performance liquid chromatography method (Enzyme-HPLC method), of 75.2% by mass;

(E) Ratio of glucose residues bound via α-1,4 linkage to glucose residues bound via α-1,6 linkage is 1:1.5;

(F) Total content of glucose residues bound via α-1,4 linkage and glucose residues bound via α-1,6 linkage is 68.0% in the whole glucose residues;

(G) Content of glucose residues bound via α-1,3 linkage is 3.5% in the whole glucose residue;

(H) Content of glucose residues bound via α-1,3,6 linkage is 4.5% in the whole glucose residue;

(I) Having a weight average molecular weight (Mw) of 6,300; and (J) Having Mw/Mn of 2.2.

Example 3

<Powdered Chamomile Tea>

To 10 kg of hot water at 80° C., 1.5 kg of chamomile tea leaves were added and extracted for 15 minutes at 80° C. The residue was separated and 16 kg of chamomile tea extract with Brix 1.6° was obtained. The resulting extract was clarified by centrifugation and subjected to concentration using a membrane. Then, to the resulting concentrate, 300 g of a powdery branched α-glucan mixture, having the following characteristics (A) to (J), obtained according to the method disclosed in Example 4 of the International Patent Publication No. WO2008/136331, was mixed and dissolved, and the resulting solution was lyophilized to make into a powdered chamomile tea. The mass ratio of the chamomile tea extract to the branched α-glucan mixture was 1:0.8, on a dry solid basis. When the resulting powdered chamomile tea was dissolved in hot water at 70° C., the powder was quickly dissolved and refreshing aroma and flavor inherent to chamomile tea were detected.

<Characteristics of the Branched α-Glucan Mixture>

(A) Being constructed by glucose molecules;

(B) Having a branched structure with a glucose polymerization degree of one or more, bound via a linkage except for α-1,4 linkage to a glucose residue at the non-reducing end of a linear glucan with a glucose polymerization degree of 3 or higher, having a structure of binding glucose molecules via α-1,4 linkages;

(C) Isomaltose in an amount of 41.8% by mass, on a dry solid basis, of the hydrolysate, is formed when digested by isomaltodextranase;

(D) Having a content of water-soluble dietary fiber, determined by applying high performance liquid chromatography method (Enzyme-HPLC method), of 68.5% by mass;

(E) Ratio of glucose residues bound via α-1,4 linkage to glucose residues bound via α-1,6 linkage is 1:1.9;

(F) Total content of glucose residues bound via α-1,4 linkage and glucose residues bound via α-1,6 linkage is 78.9% in the whole glucose residues;

(G) Content of glucose residues bound via α-1,3 linkage is 1.7% in the whole glucose residue;

(H) Content of glucose residues bound via α-1,3,6 linkage is 2.2% in the whole glucose residue;

(I) Having a weight average molecular weight (Mw) of 10,000; and (J) Having Mw/Mn of 2.7.

Example 4

<Powdered "Dokudami" (*Houttuynia cordata*) Tea>

To 10 kg of hot water at 90° C., 0.5 kg of "Dokudami" tea leaves were added and extracted for 15 minutes at 90° C. The residue was separated and 8 kg of "Dokudami" tea extract with Brix 1.9° was obtained. The resulting extract was clarified by centrifugation and subjected to concentration using a membrane. Then, to the resulting concentrate, 250 g of a powdery branched α-glucan mixture, having the following characteristics (A) to (J), obtained according to the method disclosed in Example 6 of the International Patent Publication No. WO2008/136331, was mixed and dissolved, and the resulting solution was lyophilized to make into a powdered "Dokudami" tea. The mass ratio of the "Dokudami" tea extract to the branched α-glucan mixture was 1:1.2, on a dry solid basis. When the resulting powdered "Dokudami" tea was dissolved in hot water at 70° C., the powder was quickly dissolved and refreshing aroma and flavor inherent to "Dokudami" tea were detected.

<Characteristics of the Branched α-Glucan Mixture>

(A) Being constructed by glucose molecules;

(B) Having a branched structure with a glucose polymerization degree of one or more, bound via a linkage except for α-1,4 linkage to a glucose residue at the non-reducing end of a linear glucan with a glucose polymerization degree of 3 or higher, having a structure of binding glucose molecules via α-1,4 linkages;

(C) Isomaltose in an amount of 40.1% by mass, on a dry solid basis, of the hydrolysate, is formed when digested by isomaltodextranase;

(D) Having a content of water-soluble dietary fiber, determined by applying high performance liquid chromatography method (Enzyme-HPLC method), of 83.8% by mass;

(E) Ratio of glucose residues bound via α-1,4 linkage to glucose residues bound via α-1,6 linkage is 1:3.8;

(F) Total content of glucose residues bound via α-1,4 linkage and glucose residues bound via α-1,6 linkage is 66.6% in the whole glucose residues;

(G) Content of glucose residues bound via α-1,3 linkage is 2.6% in the whole glucose residue;

(H) Content of glucose residues bound via α-1,3,6 linkage is 5.6% in the whole glucose residue;

(I) Having a weight average molecular weight (Mw) of 3,200; and (J) Having Mw/Mn of 2.1.

Reference Example

<Powdery Plant Extract for Beverages>

Six types of powdered green tea were prepared by the same method in Example 1 except for using 6 types of conventional dextrins, i.e., a dextrin with DE 25 (trade name "PINDEX #3", commercialized by Matsutani Chemical Industry Co., Ltd., Hyogo, Japan), a dextrin with DE 20 (trade name "LDX35-20", commercialized by Showa Sangyo Co., Ltd., Tokyo, Japan), a dextrin with DE 15 (trade name "GLYSTAR", commercialized by Matsutani Chemical Industry Co., Ltd., Hyogo, Japan), a dextrin with DE 14 (trade name "LIQUID DEXTRIN", commercialized by Matsutani Chemical Industry Co., Ltd., Hyogo, Japan), a dextrin with DE 11 (trade name "PINDEX #2", commercialized by Matsutani Chemical Industry Co., Ltd., Hyogo, Japan), or a dextrin with DE 4 (trade name "PINDEX #100", commercialized by Matsutani Chemical Industry Co., Ltd., Hyogo, Japan) as a substitute of the branched α-glucan used in Example 1.

Six types of powdery plant extract for beverages (powdered green tea), obtained in this example, and the powdery plant extract for beverages (powdered green tea) of the present invention, obtained in Example 1, were respectively put in a cup to give the amount of 0.33 g-solid derived from green tea extract, dissolved in 100 ml of hot water at 70° C., and then their flavors were compared. As a result, any one of 6 powdery plant extracts for beverages, obtained in this example, was apparently inferior in terms of flavor, aroma, bitterness specific to green tea, taste derived from base material, etc., in comparison with the powdery plant extract for beverages of the present invention, obtained in Example 1.

INDUSTRIAL APPLICABILITY

As described above, the present invention is to provide a powdery plant extract for beverages, improved in flavor and solubility in comparison with conventional powdery plant extract for beverages, and a process for producing the same. The present invention greatly contributes to this field and its industrial applicability is extremely large.

The invention claimed is:

1. A powdery plant extract for beverages, comprising a plant extract for beverages and a branched α-glucan mixture having the following characteristics (A) to (C):

(A) being constructed by glucose molecules;
(B) having a branched structure with a glucose polymerization degree of one or more, bound via a linkage except for α-1,4 linkage to a glucose residue at the non-reducing end of a linear glucan with a glucose polymerization degree of 3 or higher, having a structure of binding glucose molecules via α-1,4 linkages; and
(C) isomaltose in an amount of 5% by mass or higher, on a dry solid basis, of the hydrolysate is formed when digested by isomaltodextranase;
where the mass ratio of the plant extract for beverages and the branched α-glucan mixture, both comprised in the powdery plant extract for beverages, is in a range of 1:0.5 to 1:5, on a dry solid basis; and
wherein the plant extract for beverages is an extract from one or more plants selected from the group consisting of *Camellia sinensis*, chamomile, hibiscus, lavender, mint, rose hip, peppermint, lemongrass, *Houttuynia cordata*, *Gymnema*, banaba (*Lagerstroemia* speciose), *Ginkgo biloba*, *Corchorus olitorius*, alfalfa, *Artemisia indica*, *Ilex paraguariensis*, *Gabaron*, *Eucommia ulmoides*, *Aspalathus linearis*, aloe, cherry leaf, *Perilla frutescens* var. crispa, wheat, pearl barley, rice, soy, buckwheat, *Ginseng*, and burdock.

2. The powdery plant extract for beverages of claim 1, wherein said branched α-glucan mixture has the following characteristic (D):
(D) having a content of water-soluble dietary fiber, determined by applying high performance liquid chromatography method (Enzyme-HPLC method), of 40% by mass or higher.

3. The powdery plant extract for beverages of claim 1, wherein said branched α-glucan mixture has the following characteristics (E) and (F):
(E) ratio of glucose residues bound via α-1,4 linkage to glucose residues bound via α-1,6 linkage is in the range of 1:0.6 to 1:4; and
(F) total content of glucose residues bound via α-1,4 linkage and glucose residues bound via α-1,6 linkage is 55% or higher in the whole glucose residues.

4. The powdery plant extract for beverages of claim 1, where the average glucose polymerization degree of said branched α-glucan mixture is 8 to 500.

5. The powdery plant extract for beverages of claim 1, wherein said plant extract for beverages is obtained by extracting from one or more plant parts selected from the group consisting of leaf, stem, flower, calyx, root and seed.

6. The powdery plant extract for beverages of claim 1, wherein said plant for the powdery plant extract for beverages is *Camellia sinensis*.

7. The powdery plant extract for beverages of claim 1, wherein said plant extract for beverages is green tea, oolong tea or black tea.

8. A process for producing a powdery plant extract for beverages, comprising the steps of:
preparing a mixture solution by admixing a branched α-glucan mixture having the following characteristics (A) to (C) with a plant extract for beverages in the presence of aqueous solvent to give a mass ratio of the plant extract for beverages to the branched α-glucan mixture of 1:0.5 to 1:5, on a dry solid basis; and
making the resulting mixture solution into a powder,
(A) being constructed by glucose molecules;
(B) having a branched structure with a glucose polymerization degree of one or more, bound via a linkage other than α-1,4 linkage to a non-reducing end glucose residue at an end position of a linear glucan with a glucose polymerization degree of 3 or higher, having a structure of binding glucose molecules via α-1,4 linkages; and
(C) isomaltose in an amount of 5% by mass or higher, on a dry solid basis, of the hydrolysate is formed when digested by isomaltodextranase,
wherein the plant extract for beverages is an extract from one or more plants selected from the group consisting of *Camellia sinensis*, chamomile, hibiscus, lavender, mint, rose hip, peppermint, lemongrass, *Houttuynia cordata*, *Gymnema*, banaba (*Lagerstroemia* speciose), *Ginkgo biloba*, *Corchorus olitorius*, alfalfa, *Artemisia indica*, *Ilex paraguariensis*, *Gabaron*, *Eucommia ulmoides*, *Aspalathus linearis*, aloe, cherry leaf, *Perilla frutescens* var. crispa, wheat, pearl barley, rice, soy, buckwheat, *Ginseng*, and burdock.

9. The powdery plant extract for beverages of claim 3, wherein said branched α-glucan mixture has the following characteristic (D):
(D) having a content of water-soluble dietary fiber, determined by applying high performance liquid chromatography method (Enzyme-HPLC method), of 40% by mass or higher.

10. The powdery plant extract for beverages of claim 3, where the average glucose polymerization degree of said branched α-glucan mixture is 8 to 500.

11. The powdery plant extract for beverages of claim 3, wherein said plant extract for beverages is obtained by extracting from one or more plant parts selected from the group consisting of leaf, stem, flower, calyx, root and seed.

12. The powdery plant extract for beverages of claim 3, wherein said plant for the powdery plant extract for beverages is *Camellia sinensis*.

13. The powdery plant extract for beverages of claim 3, wherein said plant extract for beverages is green tea, oolong tea or black tea.

\* \* \* \* \*